US012429890B2

(12) United States Patent
Handa et al.

(10) Patent No.: US 12,429,890 B2
(45) Date of Patent: Sep. 30, 2025

(54) AERIAL VEHICLE AND CONTROL METHOD

(71) Applicant: SONY GROUP CORPORATION, Tokyo (JP)

(72) Inventors: Masaki Handa, Tokyo (JP); Takuto Motoyama, Tokyo (JP); Shinichiro Abe, Tokyo (JP); Masahiko Toyoshi, Tokyo (JP); Kohei Urushido, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 62 days.

(21) Appl. No.: 18/546,184

(22) PCT Filed: Jan. 13, 2022

(86) PCT No.: PCT/JP2022/000826
§ 371 (c)(1),
(2) Date: Aug. 11, 2023

(87) PCT Pub. No.: WO2022/176446
PCT Pub. Date: Aug. 25, 2022

(65) Prior Publication Data
US 2024/0134397 A1 Apr. 25, 2024
US 2024/0231395 A9 Jul. 11, 2024

(30) Foreign Application Priority Data

Feb. 19, 2021 (JP) .................. 2021-025122

(51) Int. Cl.
G05D 1/86 (2024.01)
B64U 20/87 (2023.01)
B64U 101/30 (2023.01)
G05D 1/611 (2024.01)

(52) U.S. Cl.
CPC ............... *G05D 1/86* (2024.01); *G05D 1/611* (2024.01); *B64U 20/87* (2023.01); *B64U 2101/30* (2023.01); *B64U 2201/104* (2023.01)

(58) Field of Classification Search
CPC .......... G05D 1/86; G05D 1/611; B64U 20/87; B64U 2101/30; B64U 2201/104
See application file for complete search history.

(56) References Cited

U.S. PATENT DOCUMENTS

2018/0002012 A1  1/2018  Mccullough et al.
2019/0004512 A1  1/2019  Liu et al.
2020/0387727 A1* 12/2020  Mishra .................. G01C 21/005

FOREIGN PATENT DOCUMENTS

KR   10-2112290 B1    5/2020
WO   2018/109903 A1   6/2018
WO   2020/022263 A1   1/2020

OTHER PUBLICATIONS

International Search Report and Written Opinion of PCT Application No. PCT/JP2022/000826, issued on Mar. 8, 2022, 08 pages of ISRWO.

* cited by examiner

Primary Examiner — Michael D Lang
(74) Attorney, Agent, or Firm — CHIP LAW GROUP

(57) ABSTRACT

An aerial vehicle according to an embodiment of the present technology includes a recording unit, a detection unit, and a reproduction unit. The recording unit records a flight parameter during flight in a state in which no sensor abnormality is detected. The detection unit detects the sensor abnormality. The reproduction unit reproduces the flight parameter on the basis of the sensor abnormality detected by the detection unit.

13 Claims, 12 Drawing Sheets

AERIAL VEHICLE AND CONTROL METHOD

CROSS REFERENCE TO RELATED APPLICATIONS

This application is a U.S. National Phase of International Patent Application No. PCT/JP2022/000826 filed on Jan. 13, 2022, which claims priority benefit of Japanese Patent Application No. JP 2021-025122 filed in the Japan Patent Office on Feb. 19, 2021. Each of the above-referenced applications is hereby incorporated herein by reference in its entirety.

TECHNICAL FIELD

The present technology relates to an aerial vehicle, a control method, and a program that can be applied to autonomous flight or the like.

BACKGROUND ART

Patent Literature 1 has described a flight control method of controlling a control mode during flight of an unmanned aircraft. The flight control method in Patent Literature 1 detects an abnormality of a flight state of the unmanned aircraft and changes the control mode to a safety control mode. This reduces damage to objects due to contact with a rotating rotary wing (e.g., paragraphs to in specification, FIG. 5, etc. in Patent Literature 1).

CITATION LIST

Patent Literature

Patent Literature 1: WO 2018/109903

DISCLOSURE OF INVENTION

Technical Problem

As to such an abnormality that can prevent such flight, it is desirable to provide a technology that can improve the safety.

In view of the above-mentioned circumstances, it is an object of the present technology to provide an aerial vehicle, a control method, and a program that can improve the safety.

Solution to Problem

In order to accomplish the above-mentioned object, an aerial vehicle according to an embodiment of the present technology includes a recording unit, a detection unit, and a reproduction unit.

The recording unit records a flight parameter during flight in a state in which no sensor abnormality is detected.

The detection unit detects the sensor abnormality.

The reproduction unit reproduces the flight parameter on the basis of the sensor abnormality detected by the detection unit.

This aerial vehicle records the flight parameter during flight in a state in which no sensor abnormality is detected. The aerial vehicle reproduces the flight parameter on the basis of the sensor abnormality in a case where the sensor abnormality has been detected. This can improve the safety.

The hovering may include a state in which coordinates of the aerial vehicle do not change.

The flight parameter may include at least one of a current value of a rotor mounted on the aerial vehicle, a voltage value of the rotor, a rotational speed value of an electric speed controller (ESC) mounted on the aerial vehicle, a current value of the ESC, or a voltage value of the ESC.

The sensor may include at least one of a global positioning system (GPS), an inertial measurement unit (IMU), an atmospheric pressure sensor, or a geomagnetic sensor.

The detection unit may detect the sensor abnormality in a case where at least one of a value of change of the GPS, a value of change of the IMU, a value of change of the atmospheric pressure sensor, or a value of change of the geomagnetic sensor is equal to or higher than a threshold and there is no operation information related to the aerial vehicle.

The aerial vehicle may further include an image-capture apparatus mounted on the aerial vehicle. In this case, the recording unit may record the flight parameter in accordance with an image-capture condition related to a condition of the image-capture apparatus.

The image-capture condition may include at least one of a position of the image-capture apparatus, an orientation of the image-capture apparatus, or an attitude of the image-capture apparatus.

The reproduction unit may reproduce the flight parameter on the basis of the position of the image-capture apparatus, the orientation of the image-capture apparatus, or the attitude of the image-capture apparatus when the sensor abnormality is detected.

The detection unit may detect the sensor abnormality on the basis of a captured image captured by the image-capture apparatus and operation information related to the aerial vehicle.

The detection unit may detect the sensor abnormality in a case where an amount of movement of the aerial vehicle estimated from the captured image is equal to or higher than a threshold and there is no operation information.

The recording unit may record the flight parameter during a time when the aerial vehicle climbs to a certain altitude and the aerial vehicle descends to a certain altitude. In this case, the reproduction unit may reproduce the flight parameter on the basis of the sensor abnormality until the aerial vehicle is landed.

A control method according to an embodiment of the present technology is a control method executed by a computer system and includes recording a flight parameter during flight in a state in which no sensor abnormality is detected.

The sensor abnormality is detected.

The flight parameter is reproduced on the basis of the sensor abnormality detected by the detection unit.

A program according to an embodiment of the present technology causes a computer system to execute the following steps.

A step of recording a flight parameter during flight in a state in which no sensor abnormality is detected.

A step of detecting the sensor abnormality.

A step of reproducing the flight parameter on the basis of the sensor abnormality detected by the detection unit.

MODE(S) FOR CARRYING OUT THE INVENTION

Hereinafter, an embodiment according to the present technology will be described with reference to the drawings.
[Control on Aerial Vehicle]

Figure 1:
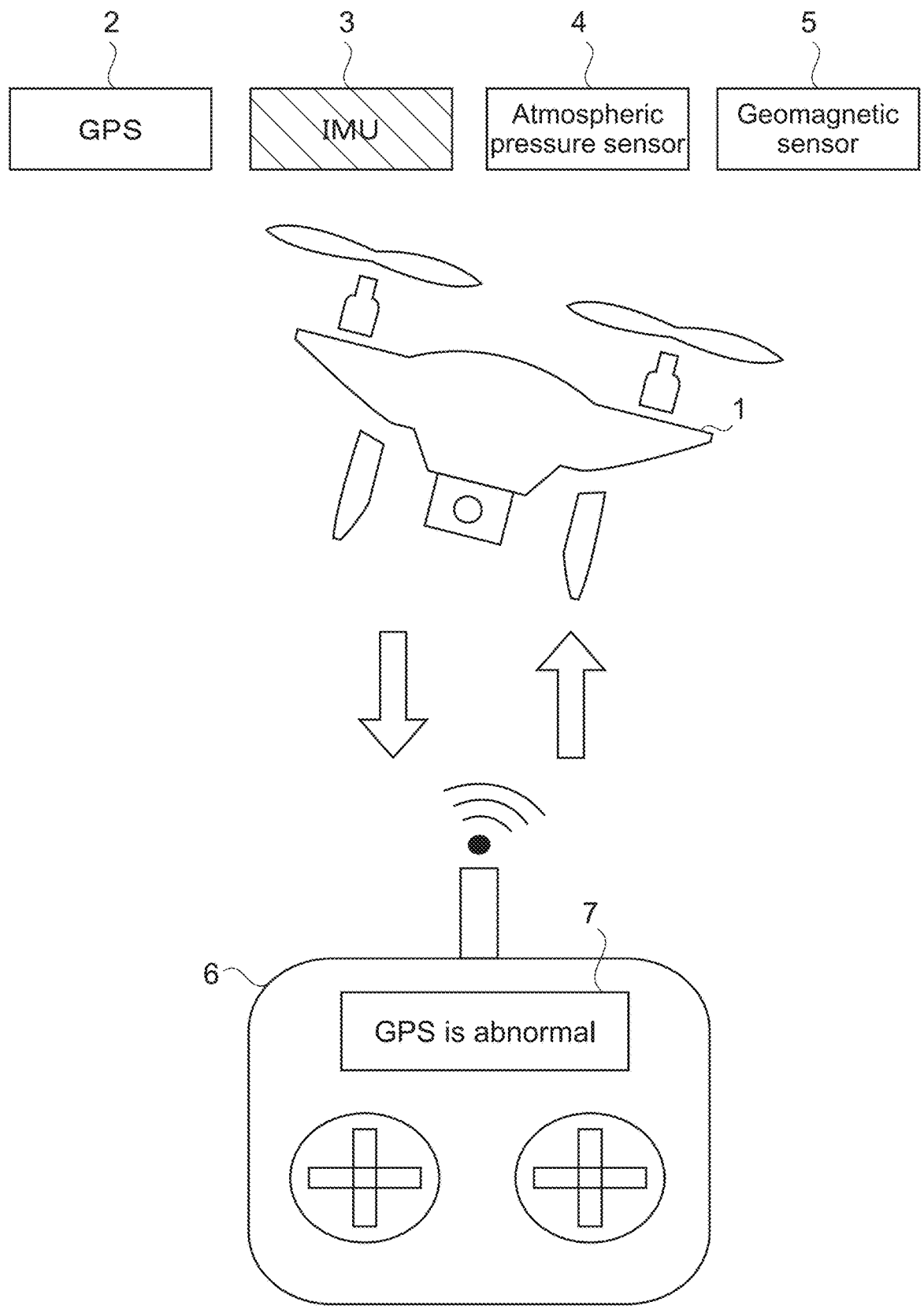
FIG. 1 A schematic diagram for outlining an aerial vehicle according to the present technology.

FIG. 1 is a schematic diagram for outlining an aerial vehicle according to the present technology.

An aerial vehicle 1 is a drone capable of flying autonomously.

As shown in FIG. 1, the aerial vehicle 1 has a global positioning system (GPS) 2, an inertial measurement unit (IMU) 3, an atmospheric pressure sensor 4, and a geomagnetic sensor 5.

The present technology is not limited, and any sensor may be mounted on the aerial vehicle 1. For example, a laser distance measurement sensor, a contact sensor, an ultrasonic sensor, light detection and ranging, laser imaging detection and ranging (LiDAR), and other sensors may be used.

The aerial vehicle 1 is capable of recording flight parameters during flight in a state in which no sensor abnormality is detected.

The flight is a variety of behaviors during the flight of the aerial vehicle 1. In the present embodiment, the flight includes at least one of take-off, climb, hovering, descent, or landing. The flight may further include a variety of behaviors during the flight of the aerial vehicle 1.

The hovering is a state in which coordinates of the aerial vehicle 1 do not change. In the present embodiment, the hovering includes operations at the aerial vehicle 1 and operations at a controller 6 (user).

Examples of the operations at the aerial vehicle 1 include remaining at arbitrary coordinates and remaining at predetermined (specified) coordinates. That is, the hovering includes a state of remaining in one place without moving and a state of remaining at arbitrary coordinates by moving under an environment with external disturbances such as winds.

Moreover, examples of the operations at the controller 6 include a state of sending no operation information to the aerial vehicle 1. Specifically, it is a state in which the user does not send an instruction to move the aerial vehicle 1 via the controller 6 for climb, descent, front/rear and left/right movement, or the like.

The flight parameters are parameters related to the flight. In the present embodiment, the flight parameters include at least one of current values of rotor, voltage values of the rotors, rotational speed values of electric speed controllers (ESCs), current values of the ESCs, or voltage values of the ESCs. The rotors and the ESCs are mounted on the aerial vehicle that is the aerial vehicle 1.

It should be noted that hereinafter, the above-mentioned flight parameters will be represented as rotational frequencies of the rotors. That is, the wordings, "reproducing the rotational frequencies of the rotors", means reproducing any one of the current values of the rotors, the voltage values of the rotors, the rotational speed values of the ESCs, the current values of the ESCs, or the voltage values of the ESCs.

Moreover, the aerial vehicle 1 has a detection unit that detects abnormalities of the GPS 2, the IMU 3, the atmospheric pressure sensor 4, and the geomagnetic sensor 5. For example, FIG. 1 shows a state in which the detection unit detects an abnormality of the IMU 3.

The aerial vehicle 1 further has a reproduction unit that reproduces the flight parameters on the basis of a sensor abnormality detected by the detection unit. For example, the reproduction unit reproduces the rotational frequencies of the rotors during hovering of the aerial vehicle 1 in a case where the detection unit has detected an abnormality of the IMU 3. Accordingly, reproducing the rotational frequencies of the rotors during stable hovering can stabilize the flight even if a sensor abnormality prevents the aerial vehicle 1 from flying in a stable attitude.

Moreover, in the present embodiment, in a case where the detection unit has detected a sensor abnormality, notification information for notifying the controller 6 of the sensor abnormality is sent. The user is able to know the sensor abnormality by checking a display 7 mounted on the controller 6.

Figure 2:
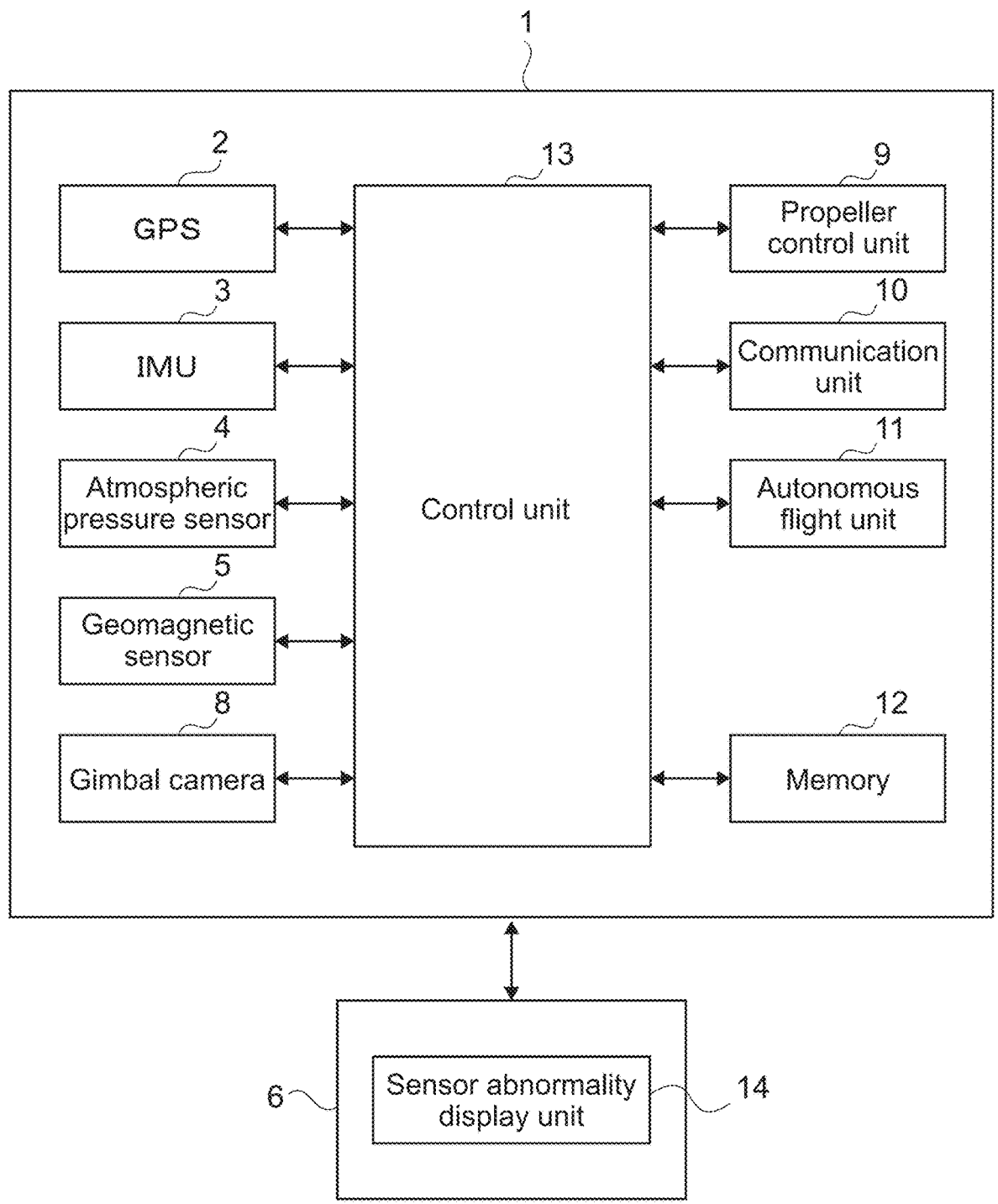
FIG. 2 A block diagram showing functional configuration examples of the aerial vehicle and a controller.

FIG. 2 is a block diagram showing functional configuration examples of the aerial vehicle 1 and the controller 6.

As shown in FIG. 2, the aerial vehicle 1 has the GPS 2, the IMU 3, the atmospheric pressure sensor 4, the geomagnetic sensor 5, a gimbal camera 8, a propeller control unit 9, a communication unit 10, an autonomous flight unit 11, a memory 12, and a control unit 13.

The GPS 2 detects information about a current position of the aerial vehicle 1.

The IMU 3 detects acceleration, angular velocity, and the like of the aerial vehicle 1. That is, the IMU 3 is capable of detecting a tilt, a motion (parallel movement), a speed, a displacement, a rotation, an angle, and the like of the aerial vehicle 1.

The atmospheric pressure sensor 4 detects an altitude of the aerial vehicle 1 on the basis of an atmospheric pressure.

The geomagnetic sensor 5 detects an orientation and the like of the aerial vehicle 1.

In the present embodiment, the GPS 2, the IMU 3, the atmospheric pressure sensor 4, and the geomagnetic sensor 5 detect a variety of information of the aerial vehicle 1 and provide them to the control unit 13.

The gimbal camera 8 is an image-capture apparatus mounted on the aerial vehicle 1. The gimbal camera 8 is capable of capturing moving images and still images. It should be noted that the image-capture apparatus mounted on the aerial vehicle 1 is not limited. In the present embodiment, the gimbal camera 8 provides the captured image information to the control unit 13. Moreover, in the present embodiment, image-capture conditions of the gimbal camera 8 are provided to the control unit 13.

The image-capture conditions include at least one of a position, an orientation, or an attitude of the gimbal camera 8.

The propeller control unit 9 controls propellers of the aerial vehicle 1. In the present embodiment, the aerial vehicle 1 has four propellers and also has rotors and ESCs capable of controlling their rotational frequencies. For example, the propeller control unit 9 is capable of controlling the rotational frequencies of the rotors of the respective propellers during flight such as hovering.

In the present embodiment, the propeller control unit 9 controls the rotational frequencies of the rotors of the respective propellers in accordance with a control signal provided from the control unit 13.

The communication unit 10 receives operation information of the aerial vehicle 1 input via the controller 6. For example, the communication unit 10 receives operation information input by the user and provides the operation information to the propeller control unit 9.

In the present embodiment, the communication unit 10 provides operation information to operate the aerial vehicle 1 and information about the presence/absence of the operation information to the control unit 13.

The autonomous flight unit 11 performs control related to autonomous movement of the aerial vehicle 1. Specifically, for example, the autonomous flight unit 11 performs coordinated control aiming to achieve a function of collision avoidance or impact mitigation of the aerial vehicle 1, following movement based on a distance between aerial vehicles, cruise control movement, or collision warning of the aerial vehicle 1. Moreover, for example, the autonomous flight unit 11 performs coordinated control aiming at for example autonomous movement to autonomously move independent of the user's operations.

A specific configuration of the autonomous flight unit 11 is not limited. For example, a programmable logic device (PLD) such as a field programmable gate array (FPGA) or another device such as an application specific integrated circuit (ASIC) may be used.

The memory 12 records a variety of information about the aerial vehicle 1. For example, the memory 12 records flight parameters during flight. Examples of the memory 12 include a magnetic storage device, a semiconductor storage device, an optical storage device, and a magneto-optical storage device such as a read only memory (ROM), a random access memory (RAM), and a hard disc drive (HDD).

In addition, the memory 12 may record a flight pattern and the like of the aerial vehicle 1. That is, the memory 12 also records a trajectory, a speed, and the like defined as a pattern, e.g., rolling or figure-8 flight. For example, the memory 12 may record a speed, a curvature, and the like of the aerial vehicle 1 in performing rolling or figure-8 flight with respect to the flight pattern, e.g., rolling or figure-8 flight.

In the present embodiment, the memory 12 provides the recorded flight parameters to the control unit 13.

The control unit 13 records flight parameters during flight in a state in which no abnormalities of the sensors (the GPS 2, the IMU 3, the atmospheric pressure sensor 4, and the geomagnetic sensor 5) are detected. In a case where a sensor abnormality has been detected, the control unit 13 reproduces the flight parameters on the basis of the sensor abnormality.

Specific functional configurations will be described with reference to FIG. 3.

As shown in FIG. 2, the controller 6 has a sensor abnormality display unit 14.

The sensor abnormality display unit 14 has a device capable of outputting visual information or auditory information to the user. For example, the sensor abnormality display unit 14 has a display, an audio speaker, and the like so as to be capable of displaying a sensor abnormality.

Figure 3:
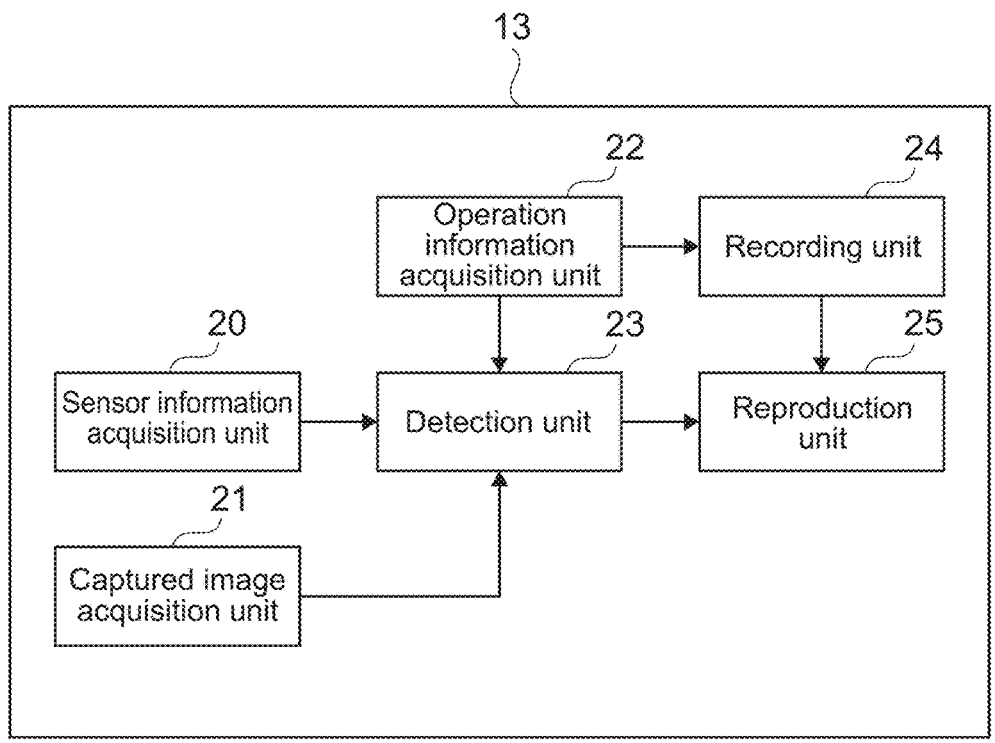
FIG. 3 A block diagram showing functional configuration examples of a control unit.

FIG. 3 is a block diagram showing functional configuration examples of the control unit 13.

Figure 13:
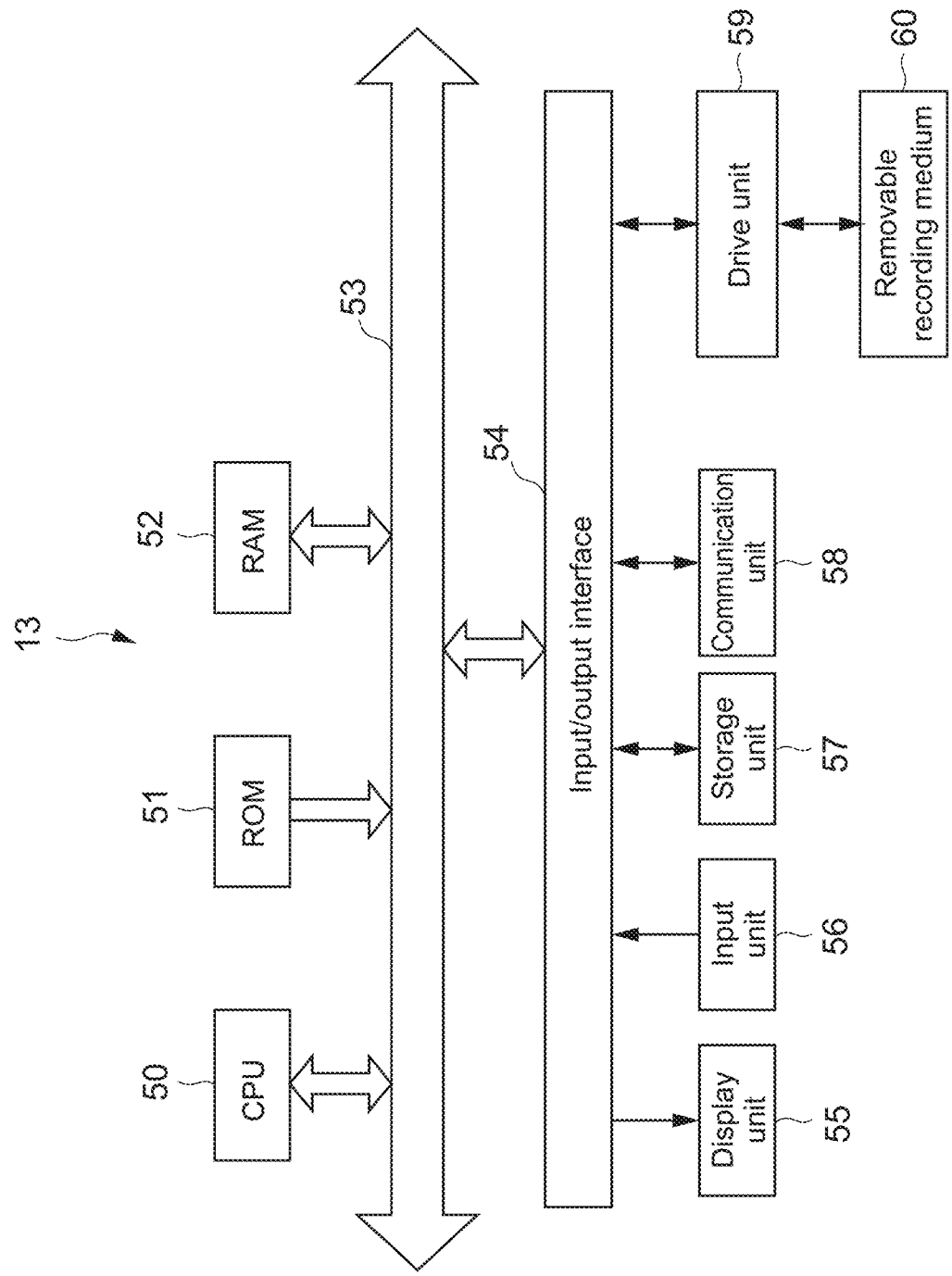
FIG. 13 A block diagram showing hardware configuration examples of the control unit.

The control unit 13 has hardware required for a computer configuration, e.g., a processor such as CPU, GPU, and DSP, a memory such as ROM and RAM, and a storage device such as an HDD (see FIG. 13). For example, the CPU loading a program according to the present technology recorded in advance in the ROM or the like to the RAM and executing it executes a control method according to the present technology.

Any computer, e.g., a PC can achieve the control unit 13. Hardware such as FPGA and ASIC may be used as a matter of course.

In the present embodiment, the CPU executing a predetermined program configures the detection unit, the recording unit, and the reproduction unit as the functional blocks. As a matter of course, dedicated hardware such as an integrated circuit (IC) may be used for achieving the functional blocks.

The control unit 13 installs the program via a variety of recording media, for example. Alternatively, the control unit 13 may install the program via the Internet, for example.

The type and the like of the recording medium for recording the program are not limited, and any computer-readable recording medium may be used. For example, any computer-readable non-transitory storage medium may be used.

As shown in FIG. 3, the control unit 13 has a sensor information acquisition unit 20, a captured image acquisition unit 21, an operation information acquisition unit 22, a detection unit 23, a recording unit 24, and a reproduction unit 25.

The sensor information acquisition unit 20 acquires sensor information acquired by the sensors. In the present embodiment, the sensor information acquisition unit 20 acquires sensor information acquired by the GPS 2, the IMU 3, the atmospheric pressure sensor 4, and the geomagnetic sensor 5. In the present embodiment, the sensor information acquisition unit 20 provides the acquired sensor information to the detection unit 23.

The captured image acquisition unit 21 acquires captured image captured by the gimbal camera 8. In the present embodiment, the captured image acquisition unit 21 provides the acquired image information to the detection unit 23.

The operation information acquisition unit 22 acquires operation information of the aerial vehicle 1 acquired by the communication unit 10. In the present embodiment, the operation information acquisition unit 22 provides information about the presence/absence of the operation information to the detection unit 23 and the recording unit 24. Moreover, no input of operation information represents a state in which the aerial vehicle 1 is hovering in the present embodiment.

The detection unit 23 detects a sensor abnormality. The detection unit 23 detects abnormalities of the GPS 2, the IMU 3, the atmospheric pressure sensor 4, and the geomagnetic sensor 5 on the basis of the sensor information acquired by the sensor information acquisition unit 20.

In the present embodiment, the detection unit 23 detects a sensor abnormality on the basis of inconsistency between the operation information and the sensor. Specifically, the detection unit 23 detects an abnormality of the GPS 2 in a case where there is no operation information and a value of change of the GPS 2 is equal to or higher than a threshold. The detection unit 23 detects an abnormality of the IMU 3 in a case where there is no operation information and a value of change of the IMU 3 is equal to or higher than a threshold. The detection unit 23 detects an abnormality of the atmospheric pressure sensor 4 in a case where there is no operation information and a value of change of the atmospheric pressure sensor 4 is equal to or higher than a threshold. The detection unit 23 detects an abnormality of the geomagnetic sensor 5 is detected in a case where there is no operation information and a value of change of the geomagnetic sensor 5 is equal to or higher than a threshold.

Moreover, in the present embodiment, the detection unit 23 detects a sensor abnormality on the basis of inconsistency between the operation information and an image processing result. Specifically, the detection unit 23 detects a sensor abnormality in a case where there is no operation information and an amount of movement of the aerial vehicle 1 estimated from the image information is equal to or higher than a threshold. Moreover, the detection unit 23 detects a sensor abnormality in a case where an amount of movement based on optical flow detection is equal to or higher than a threshold. Moreover, the detection unit 23 detects a sensor abnormality in a case where an amount of movement based on simultaneous localization and mapping (SLAM) is equal to or higher than a threshold.

The detection unit 23 provides the detected sensor abnormality to the reproduction unit 25.

The recording unit 24 records flight parameters during flight in a state in which no sensor abnormality is detected. In the present embodiment, the recording unit 24 records flight parameters when there is no operation information. That is, the recording unit 24 records rotational frequencies of the respective rotors while the aerial vehicle 1 is hovering. It will be described in detail with reference to FIG. 4.

Moreover, in the present embodiment, the recording unit 24 records flight parameters for each set of position, orientation, and attitude of the gimbal camera 8.

Moreover, the recording unit 24 records rotational frequencies of the rotors during descent in a state in which no sensor abnormality is detected. A specific example will be described with reference to FIG. 9.

The recording unit 24 provides the recorded flight parameters to the reproduction unit 25.

The reproduction unit 25 reproduces the flight parameters recorded in the recording unit 24 on the basis of a sensor abnormality detected by the detection unit 23. In the present embodiment, the reproduction unit 25 reproduces the rotational frequencies of the rotors during hovering, which have been recorded in the recording unit 24, when the detection unit 23 provides a sensor abnormality.

Moreover, the reproduction unit 25 reproduces the rotational frequencies of the rotors during descent until the aerial vehicle 1 is landed in a case where a sensor abnormality has been detected.

It should be noted that in the present embodiment, the gimbal camera 8 corresponds to an image-capture apparatus mounted on the aerial vehicle.

It should be noted that in the present embodiment, the detection unit 23 corresponds to a detection unit that detects a sensor abnormality.

It should be noted that in the present embodiment, the recording unit 24 corresponds to a recording unit that records flight parameters during flight in a state in which no sensor abnormality is detected.

It should be noted that in the present embodiment, the reproduction unit 25 corresponds to a reproduction unit that reproduces the flight parameters on the basis of the sensor abnormality detected by the detection unit.

Figure 4:
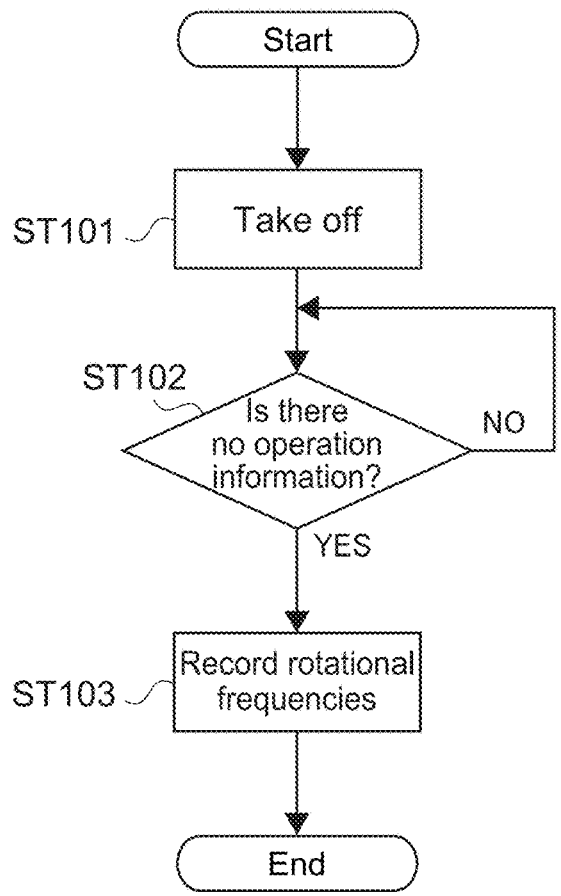
FIG. 4 A flowchart showing an example of recording flight parameters.

FIG. 4 is a flowchart showing an example of recording flight parameters.

As shown in FIG. 4, when the aerial vehicle 1 takes off (Step 101), it is determined whether or not the operation information acquisition unit 22 has acquired operation information (Step 102).

In a case where there is no operation information (YES in Step 102), the recording unit 24 records rotational frequencies of the rotors during hovering (Step 103).

Figure 5:
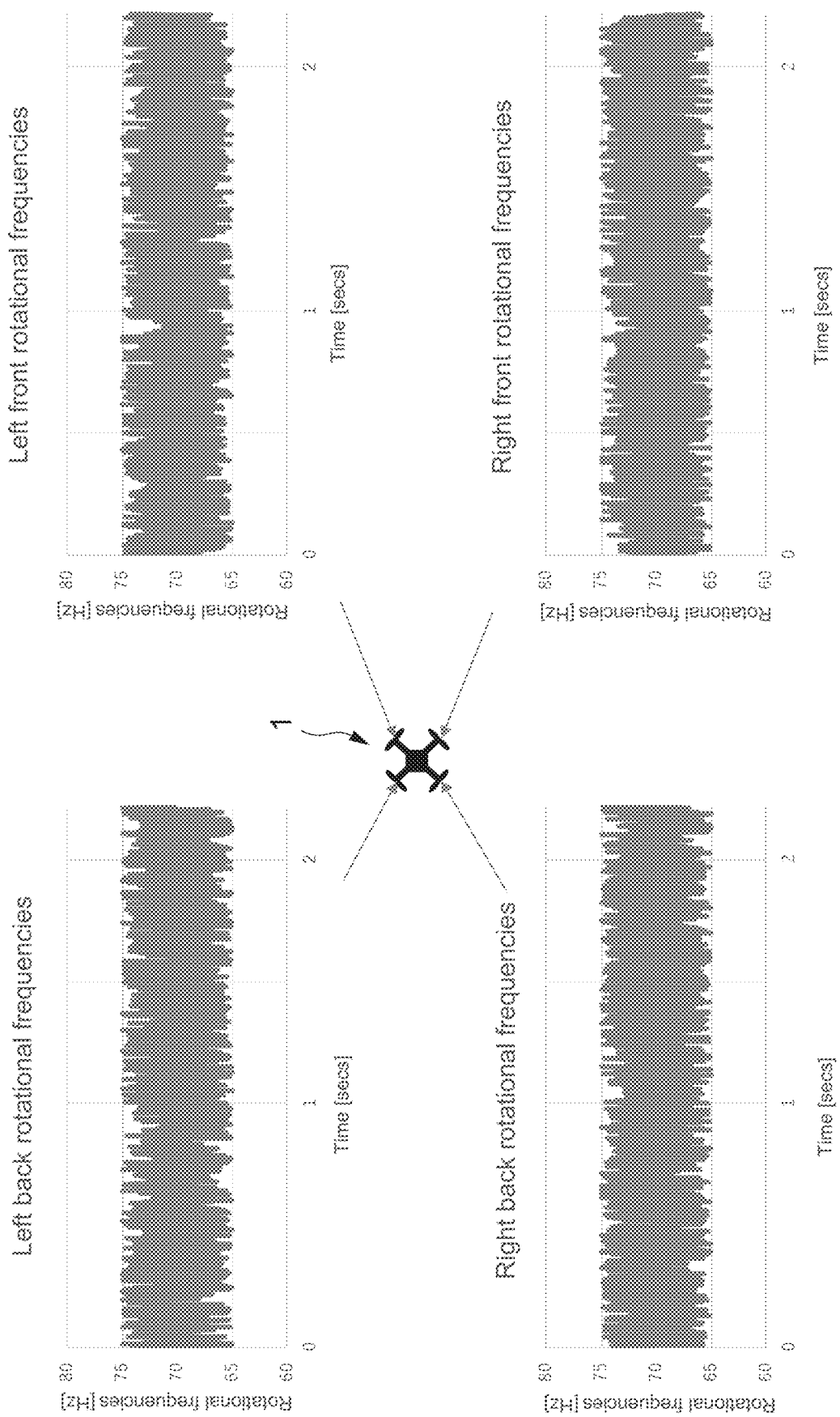
FIG. 5 A diagram showing an example of recorded flight parameters.

FIG. 5 is a diagram showing an example of recorded flight parameters.

The recording unit 24 records rotational frequencies of the respective rotors of the aerial vehicle 1. In the present embodiment, the aerial vehicle 1 has the four propeller. FIG. 5 shows the four propellers as left front, left back, right front, and right back propellers.

As shown in FIG. 5, the recording unit 24 records rotational frequencies of the respective rotors for predetermined several seconds. For example, the recording unit 24 records the rotational frequency (65 Hz to 75 Hz) of the rotors of the left front, left back, right front, and right back propellers for two seconds during hovering.

It should be noted that what kinds of parameters are recorded as the flight parameters is not limited. For example, an average value of rotational frequencies of the respective rotors for a predetermined time may be recorded or rotational frequencies of the rotors at an instant time may be recorded. Moreover, for example, rotational frequencies of the respective rotors and transitions of the rotational frequencies for two seconds may be recorded.

Moreover, the flight parameters may be recorded in accordance with a variety of conditions. For example, the rotational frequencies of the rotors during hovering in a surrounding environment of the aerial vehicle 1, such as winds and rain, may be recorded. Moreover, the reproduction unit 25 at that time may reproduce appropriate flight parameters in accordance with the surrounding environment of the aerial vehicle 1 in a case where any sensor has an abnormality.

Figure 6:
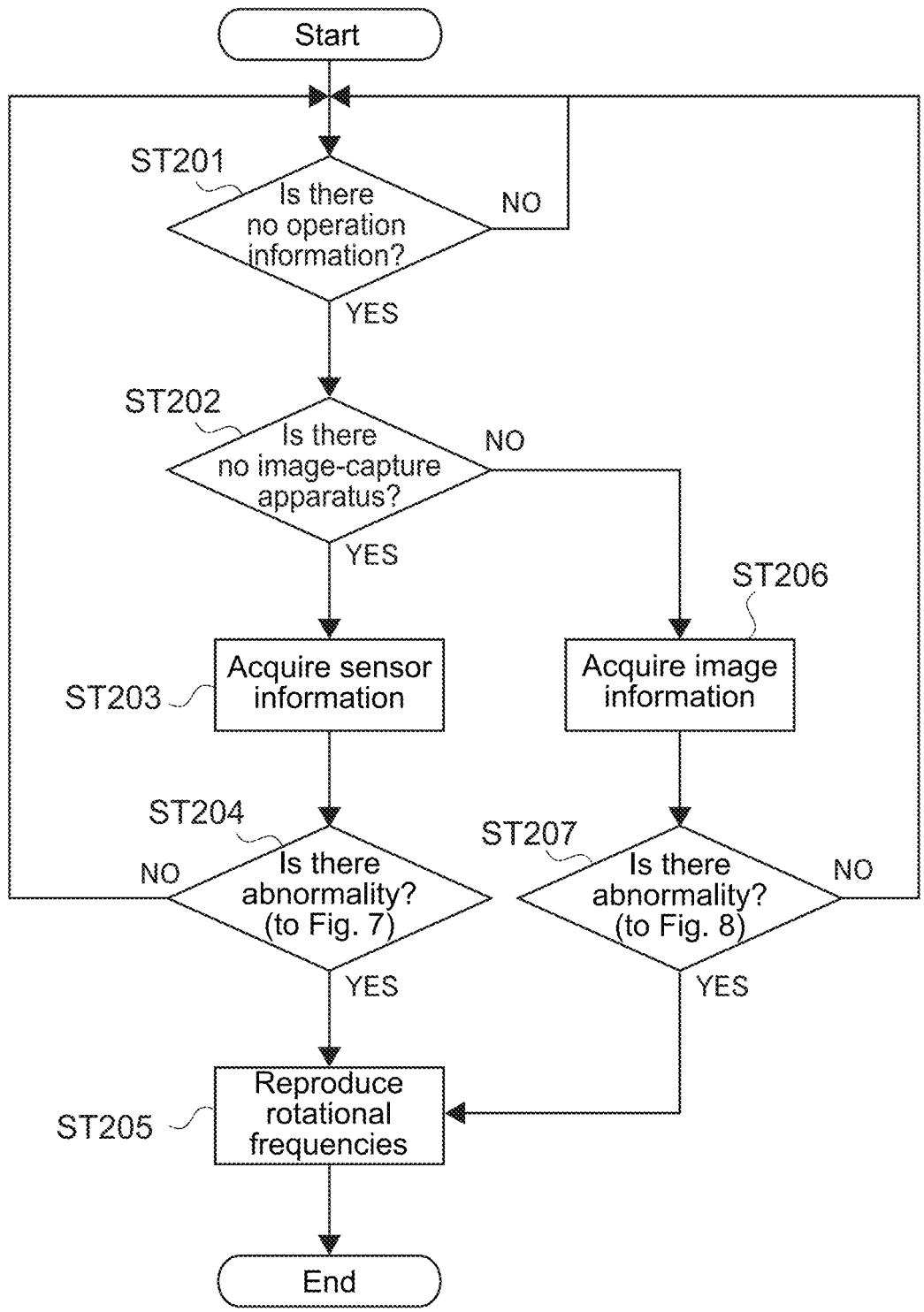
FIG. 6 A flowchart showing an example of reproducing the flight parameters.

FIG. 6 is a flowchart showing an example of reproducing the flight parameters.

As shown in FIG. 6, it is determined whether or not the operation information acquisition unit 22 has acquired operation information (Step 201).

In the present embodiment, it is determined whether or not the aerial vehicle 1 includes the image-capture apparatus (gimbal camera 8) (Step 202). In a case where the aerial vehicle 1 includes no image-capture apparatus (YES in Step 202), the sensor information acquisition unit 20 acquires sensor information (Step 203).

Figure 7:
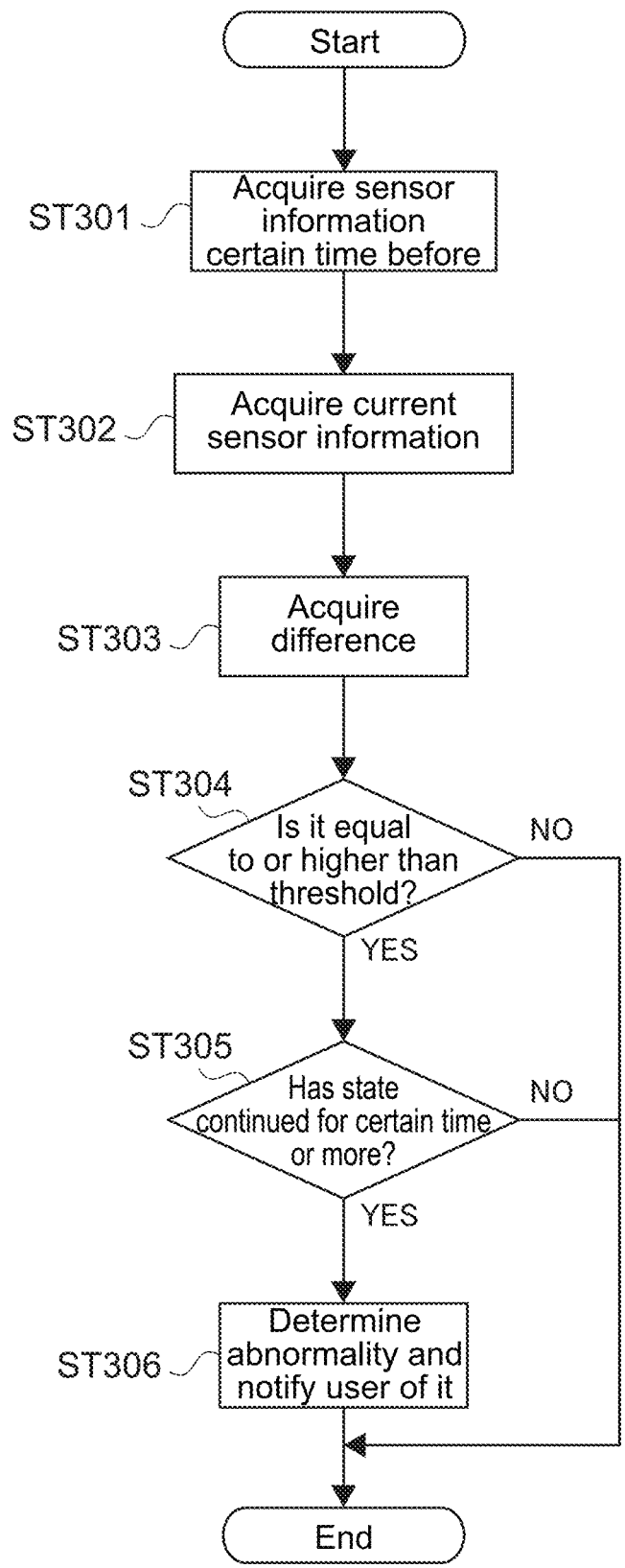
FIG. 7 An example of a flowchart in detecting a sensor abnormality.

Following the flowchart shown in FIG. 7, it is determined whether or not any sensor has an abnormality according to the detection unit 23 (Step 204). It will be specifically described later.

In a case where a sensor abnormality has been detected (YES in Step 204), the reproduction unit 25 reproduces the rotational frequencies of the rotors (Step 205).

Moreover, in a case where the aerial vehicle 1 includes the image-capture apparatus (NO in Step 202), the captured image acquisition unit 21 acquires image information (Step 206).

Figure 8:
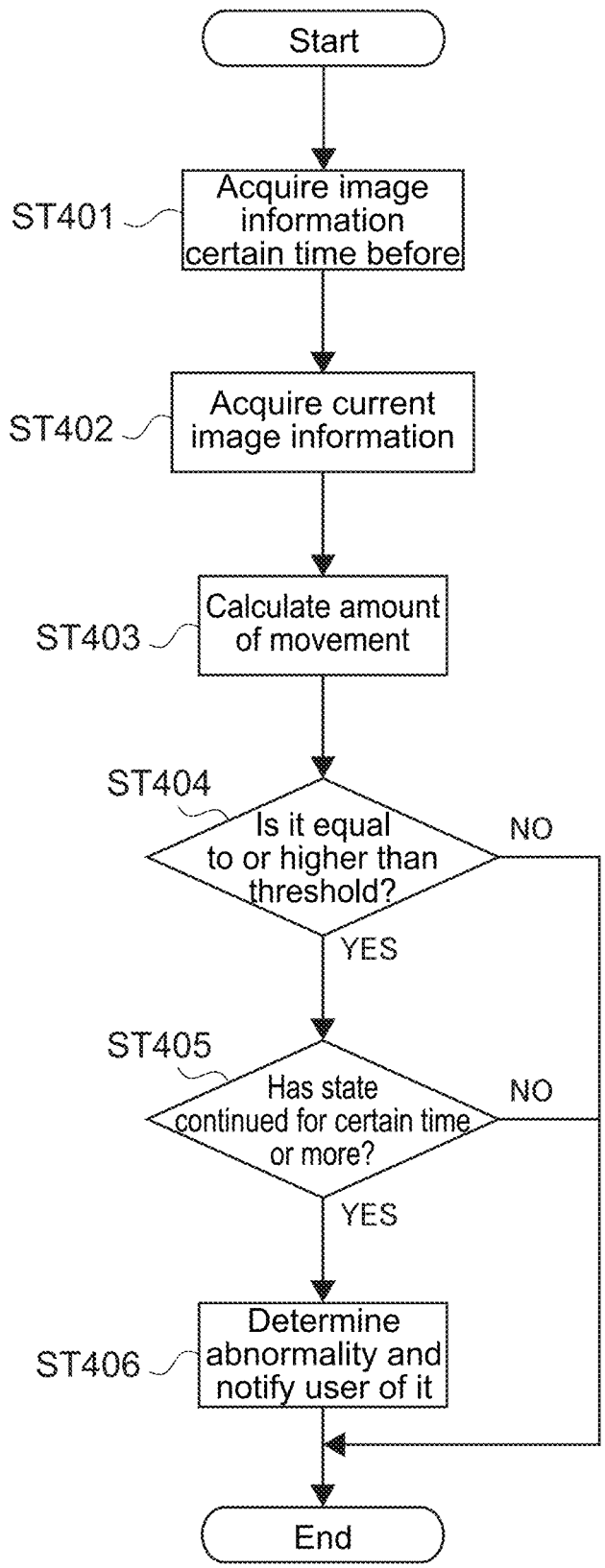
FIG. 8 Another example of the flowchart in detecting a sensor abnormality.

Following the flowchart shown in FIG. 8, it is determined whether or not any sensor has an abnormality according to the detection unit 23 (Step 207). It will be specifically described later.

In a case where a sensor abnormality has been detected (YES in Step 207), the reproduction unit 25 reproduces the rotational frequencies of the rotors (Step 205).

It should be noted that in a case where the aerial vehicle 1 includes the image-capture apparatus, i.e., in a case where it can acquire sensor information and image information, Steps 204 and 207 may be both executed. This enhances the accuracy of detecting a sensor abnormality.

FIG. 7 is an example of a flowchart of detecting a sensor abnormality.

As shown in FIG. 7, the sensor information acquisition unit 20 acquires sensor information a certain time before (Step 301). It should be noted that time intervals of acquiring the sensor information are not limited. For example, the user may specify an arbitrary time or an arbitrary time may be set in accordance with a surrounding environment of the aerial vehicle 1 and a status of the aerial vehicle 1.

Moreover, the sensor information acquisition unit 20 acquires current sensor information (Step 302).

The detection unit 23 acquires a difference between the sensor information acquired a certain time before and the current sensor information (Step 303). In the present embodiment, value differences of the GPS 2, the IMU 3, the atmospheric pressure sensor 4, and the geomagnetic sensor 5 are acquired.

It is determined whether or not a difference of the sensor information acquired by the detection unit 23 is equal to or higher than a threshold (Step 304). In a case where the difference of the sensor information is equal to or higher than the threshold (YES in Step 304), it is determined whether or not the state in which the difference of the sensor information is equal to or higher than the threshold has continued for a certain time or more (Step 305).

In a case where the state in which the difference of the sensor information is equal to or higher than the threshold has continued for a certain time or more (YES in Step 305), the communication unit 10 notifies the sensor abnormality display unit 14 of the controller 6 of the fact that the sensor has an abnormality (Step 306).

In a case where the difference of the sensor information is equal to or lower than the threshold (NO in Step 304) or in a case where the state in which the difference of the sensor information is equal to or higher than the threshold has not continued for a certain time or more (NO in Step 305), it is determined that the sensor has no abnormality (NO in Step 204).

FIG. 8 is another example of a flowchart of detecting a sensor abnormality.

As shown in FIG. 8, the captured image acquisition unit 21 acquires image information a certain time before (Step 401).

Moreover, the captured image acquisition unit 21 acquires current image information (Step 402).

The detection unit 23 acquires a difference between the image information acquired a certain time before and the current image information (Step 403). In the present embodiment, the detection unit 23 acquires a difference between an amount of movement of the aerial vehicle 1 estimated from the image information a certain time before and an amount of movement of the aerial vehicle 1 estimated from the current image information.

It should be noted that a method of estimating the amount of movement of the aerial vehicle 1 is not limited. For example, the amount of movement may be estimated by means other than the optical flow detection and SLAM.

It is determined whether or not the difference between the amounts of movement acquired by the detection unit 23 is equal to or higher than a threshold (Step 404). In a case where the difference between the amounts of movement is equal to or higher than the threshold (YES in Step 404), it is determined that the state in which the difference between the amounts of movement is equal to or higher than the threshold has continued for a certain time or more (Step 405).

In a case where the state in which the difference between the amounts of movement is equal to or higher than the threshold has continued for a certain time or more (YES in Step 405), the communication unit 10 notifies the sensor abnormality display unit 14 of the controller 6 of the fact that the sensor has an abnormality (Step 406).

In a case where the difference between the amounts of movement is equal to or lower than the threshold (NO in Step 404) or in a case where the state in which the difference between the amounts of movement is equal to or higher than the threshold has not continued for a certain time or more (NO in Step 405), it is determined that the sensor has no abnormality (NO in Step 207).

Figure 9:
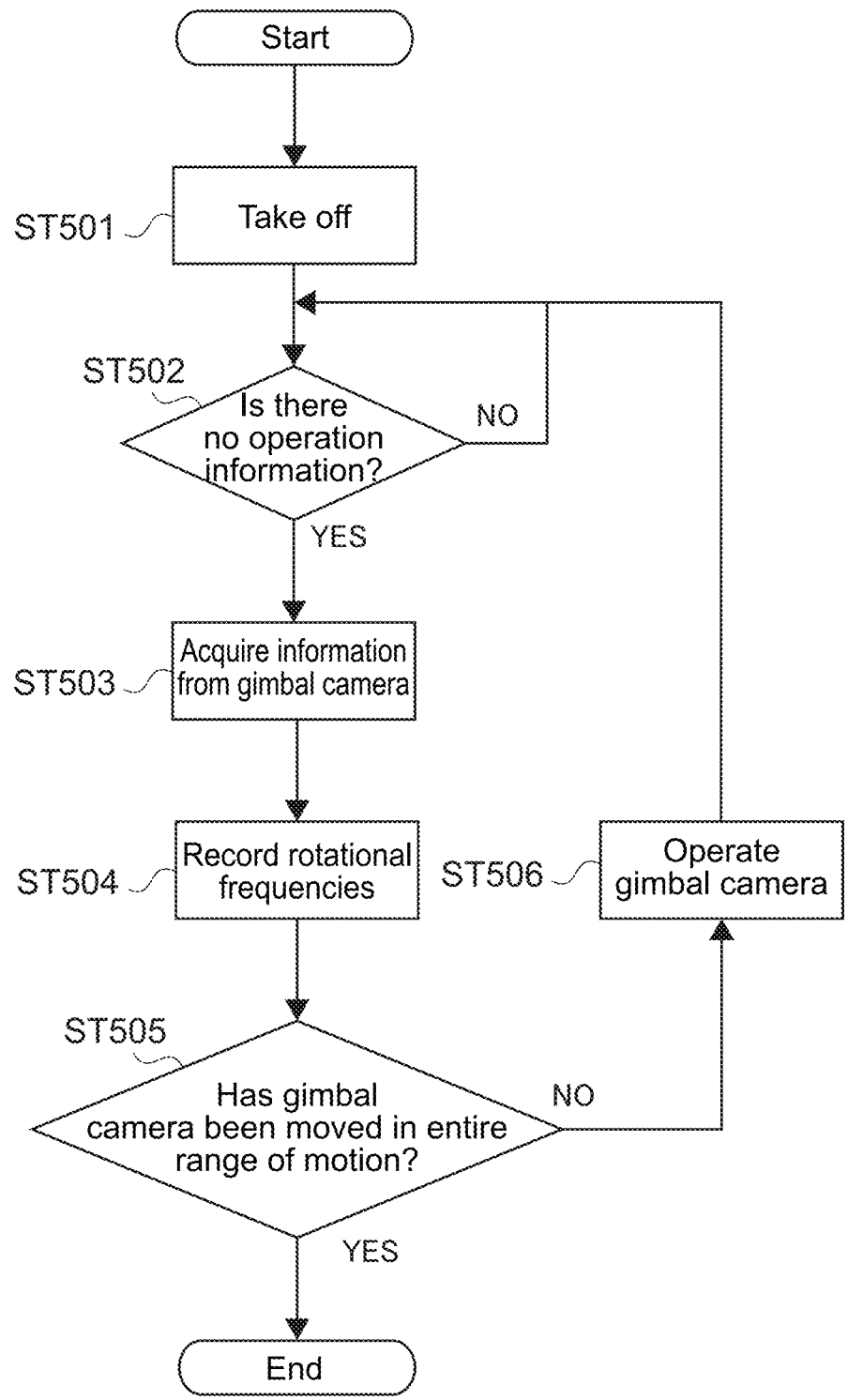
FIG. 9 A flowchart showing an example of recording flight parameters when a gimbal camera is mounted.

FIG. 9 is a flowchart showing an example of recording flight parameters in a case where the gimbal camera 8 is mounted.

As shown in FIG. 9, when the aerial vehicle 1 takes off (Step 501), it is determined whether or not the operation information acquisition unit 22 has acquired operation information (Step 502).

In a case where there is no operation information (YES in Step 502), information about the gimbal camera 8 is acquired (Step 503). In the present embodiment, information about position, orientation, and attitude of the gimbal camera 8 is acquired.

The recording unit 24 records rotational frequencies of the rotors during hovering based on the information about the position, orientation, and attitude of the gimbal camera 8 (Step 504). For example, the recording unit 24 records rotational frequencies of the rotors during hovering for each position of the gimbal camera 8 in a case where it is mounted on the aerial vehicle 1 (center of weight of the aerial vehicle with the gimbal camera mounted). Moreover, for example, the recording unit 24 records rotational frequencies of the rotors during hovering for each orientation of the gimbal camera 8 (image-capture direction).

It is determined whether or not the gimbal camera 8 has been moved in the entire range of motion and flight parameters for each piece of information about position, orientation, and attitude of the gimbal camera 8 have been recorded (Step 505). Flight parameters per 5 degrees are recorded for example in a case where the gimbal camera 8 is rotatable at 360 degrees by 5 degrees each time.

In a case where the gimbal camera 8 has not been moved in the entire range of motion (NO in Step 505), an operation of the gimbal camera 8 is executed (Step 506). At this time, the operation of the gimbal camera 8 may be performed automatically or may be performed manually.

Figure 10:
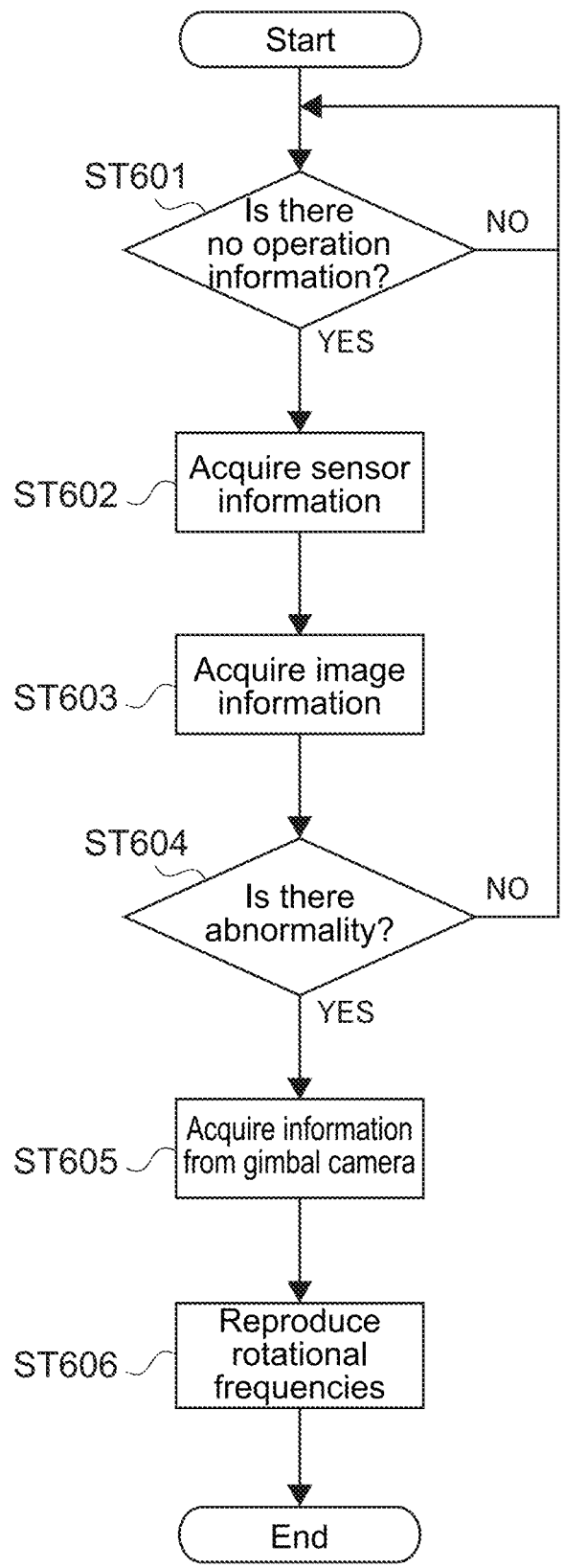
FIG. 10 A flowchart showing an example of reproducing the flight parameters when the gimbal camera is mounted.

FIG. 10 is a flowchart showing an example of reproducing the flight parameters in a case where the gimbal camera 8 is mounted.

As shown in FIG. 10, it is determined whether or not the operation information acquisition unit 22 has acquired operation information (Step 601).

The sensor information acquisition unit 20 acquires sensor information (Step 602). Moreover, the captured image acquisition unit 21 acquires image information (Step 603).

It is determined whether or not any sensor has an abnormality according to the detection unit 23 (Step 604). The sensor abnormality determination is as shown in flowcharts of FIGS. 7 and 8.

In a case where a sensor abnormality has been detected (YES in Step 604), information about position, orientation, and attitude of the gimbal camera 8 is acquired (Step 605).

The reproduction unit 25 reproduces the rotational frequencies of the rotors in accordance with the current information about the position, orientation, and attitude of the gimbal camera 8 (Step 606).

As describe above, the aerial vehicle 1 according to the present embodiment records the flight parameters during flight in the state in which no abnormalities of the GPS 2, the IMU 3, the atmospheric pressure sensor 4, and the geomagnetic sensor 5 are detected. In a case where an abnormality of the GPS 2, the IMU 3, the atmospheric pressure sensor 4, or the geomagnetic sensor 5 has been detected, the flight parameters are reproduced on the basis of the sensor abnormality. This can improve the safety.

Conventionally, an aerial vehicle such as a drone includes sensors such as a GPS, an IMU, an atmospheric pressure sensor, and a geomagnetic sensor. These sensors achieve flight in a stable attitude. However, a sensor abnormality causes an attitude estimation error, and the aerial vehicle can malfunction and fly in an unexpected direction or crash for example.

Moreover, let's assume that flight control prepared in advance is executed in a case where any sensor has an abnormality. In this case, the sensor abnormality may not be well addressed because aerial vehicle conditions such as a payload can vary depending on each aerial vehicle or the center of weight can vary depending on a camera and goods mounted on a drone.

In the present technology, flight parameters during flight in a state in which no sensor abnormality is detected are recorded, and the recorded flight parameters are reproduced when a sensor abnormality is detected.

This enables minimum hovering even in a case where any sensor has an abnormality. That is, recording the rotational frequencies of the rotors during hovering in the flying state allows reproduction of the flight parameters during stable hovering during flight. Moreover, recording the flight parameters during flight can address a wide variety of aerial vehicle conditions.

Moreover, recording the flight parameters during hovering for each set of position, orientation, and attitude of the gimbal camera mounted on the drone can also address a variety of conditions.

Moreover, in the present technology, recording flight parameters for descent allows landing on that place from hovering. That is, damage of the drone due to crash or the like and collision with humans and objects can be prevented.

Other Embodiments

The present technology is not limited to the above-mentioned embodiment, and various other embodiments can be achieved.

In the above-mentioned embodiment, in a case where a sensor abnormality has been detected, the flight parameters are reproduced so that the aerial vehicle 1 can hover. The present technology is not limited thereto, and flight parameters to perform a variety of safe behaviors may be reproduced when detecting a sensor abnormality. For example, in FIGS. 11 and 12, the flight parameters during descent are recorded. It should be noted that a variety of flight parameters for avoidance of an obstacle, a movement to the user's position, return to a departure point, and the like other than hovering and descent (landing) may be recorded and reproduced.

Figure 11:
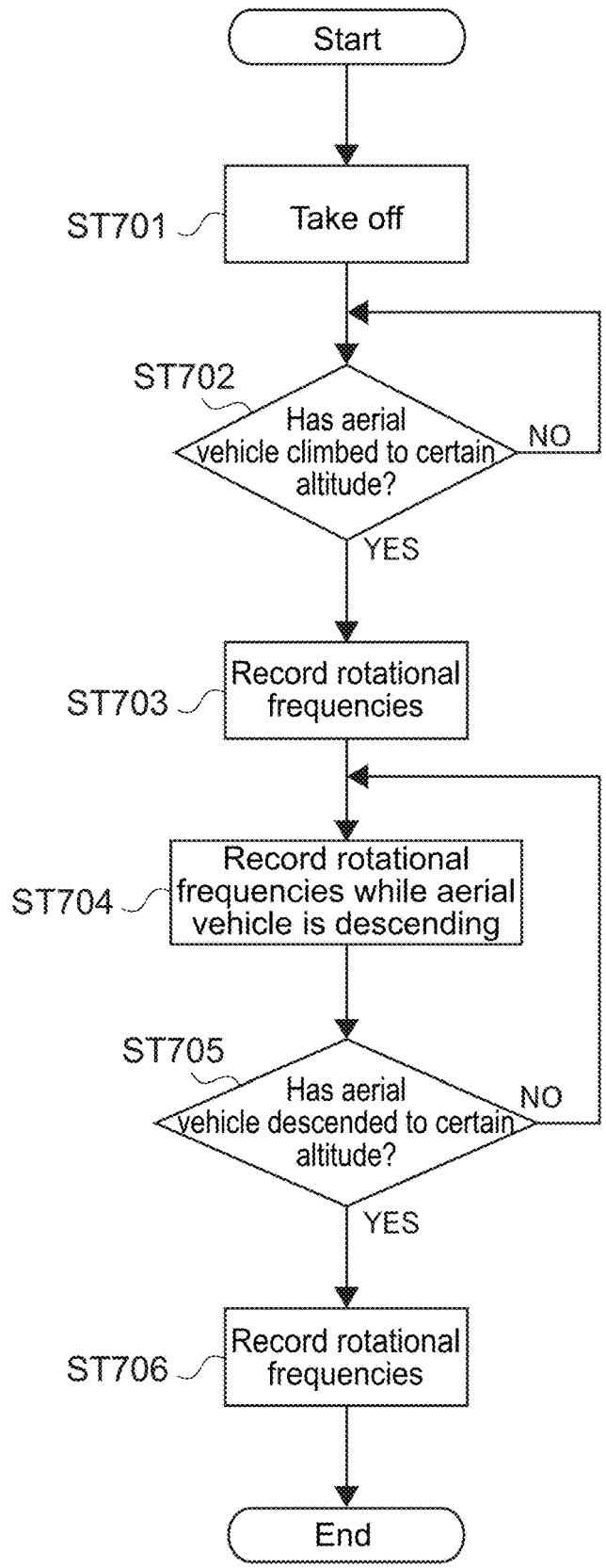
FIG. 11 A flowchart showing an example of recording flight parameters during descent.

FIG. 11 is a flowchart showing an example of recording flight parameters during descent.

As shown in FIG. 11, when the aerial vehicle 1 takes off (Step 701), it is determined whether or not the aerial vehicle 1 has climbed to a certain altitude (Step 702). For example, the sensor information acquisition unit 20 acquires sensor information from the atmospheric pressure sensor 4 and acquires a current altitude of the aerial vehicle 1.

The recording unit 24 records rotational frequencies of the rotors of the aerial vehicle 1 that has climbed to the certain altitude (Step 703).

In the present embodiment, the recording unit 24 records rotational frequencies while the aerial vehicle 1 is descending for recording the flight parameters during descent of the aerial vehicle 1 (Step 704).

It is determined whether or not the aerial vehicle 1 has descended to a certain altitude (Step 705). In a case where the aerial vehicle 1 has descended to the certain altitude (YES in Step 705), the recording unit 24 records rotational frequencies of the rotors during hovering when it reaches the certain altitude (Step 706).

Figure 12:
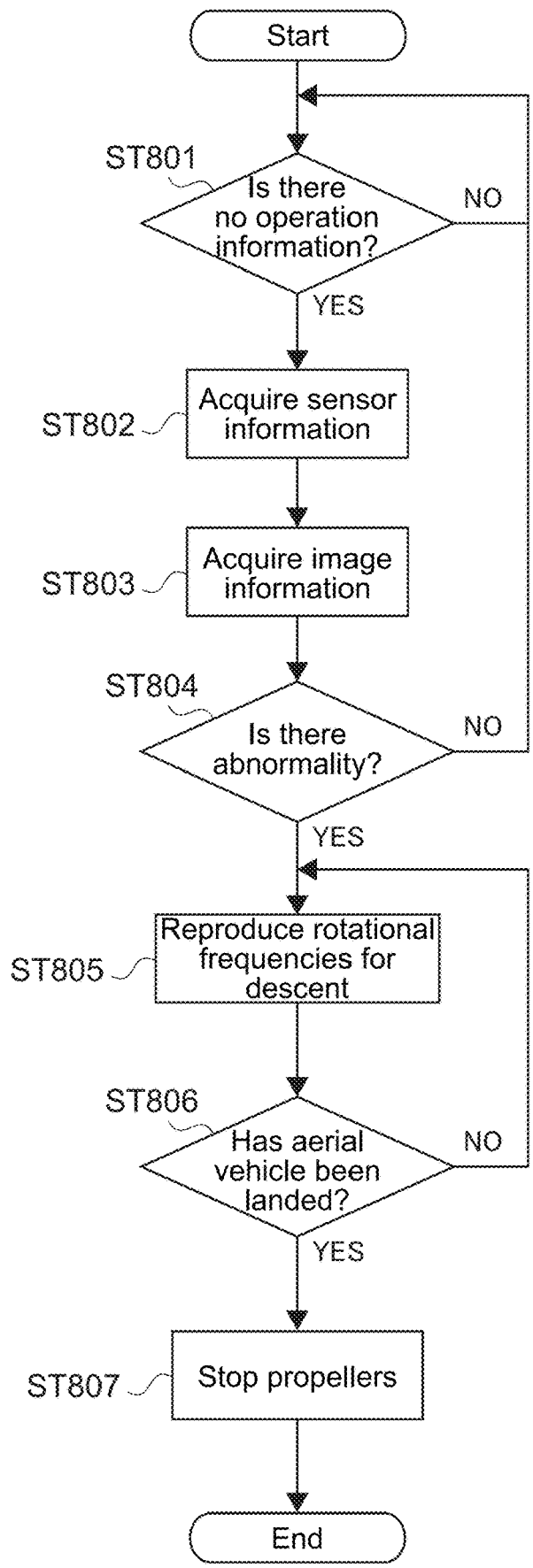
FIG. 12 A flowchart showing an example of reproducing the flight parameters during descent and landing.

FIG. 12 is a flowchart showing an example of reproducing the flight parameters during descent and landing.

As shown in FIG. 12, it is determined whether or not the operation information acquisition unit 22 has acquired operation information (Step 801).

The sensor information acquisition unit 20 acquires sensor information (Step 802). Moreover, the captured image acquisition unit 21 acquires image information (Step 803).

It is determined whether or not any sensor has an abnormality according to the detection unit 23 (Step 804). The sensor abnormality determination is as shown in flowcharts of FIGS. 7 and 8.

In a case where a sensor abnormality has been detected (YES in Step 804), the reproduction unit 25 reproduces rotational frequencies of the rotors for descent (Step 805).

It is determined whether or not the aerial vehicle 1 has been landed after the rotational frequencies of the rotors for descent are reproduced (Step 806). For example, when the altitude of the aerial vehicle 1 does not lower anymore in a state in which the rotational frequencies of the rotors are being reproduced, it is determined that the aerial vehicle 1 has been landed. Otherwise, the landing may be determined based on the contact sensor, for example.

In a case where the aerial vehicle 1 has been landed (YES in Step 806), the propellers of the aerial vehicle 1 are stopped (Step 807).

It should be noted that the order of Steps 802 and 803 is not limited. Similarly, the order of executing steps of the flowcharts of FIGS. 7 and 8 is also not limited.

FIG. 13 is a block diagram showing hardware configuration examples of the control unit 13.

The control unit 13 includes a CPU 50, a ROM 51, a RAM 52, an input/output interface 54, and a bus 53 that connects them to one another. A display unit 55, an input unit 56, a storage unit 57, a communication unit 58, a drive unit 59, and the like are connected to the input/output interface 54.

The display unit 55 is, for example, a display device using liquid crystals, EL, or the like. The input unit 56 is, for example, a keyboard, a pointing device, a touch panel, or another operation device. In a case where the input unit 56 includes a touch panel, the touch panel can be integral with the display unit 55.

The storage unit 57 is a nonvolatile storage device. The storage unit 57 is, for example, an HDD, a flash memory, or another solid-state memory. The drive unit 59 is, for example, a device capable of driving a removable recording medium 60 such as an optical recording medium and a magnetic record tape.

The communication unit 58 is a modem, a router, or another communication device for communicating with other devices, which is connectable to a LAN, a WAN, or the like. The communication unit 58 may perform wired communication or may perform wireless communication. The communication unit 58 is often used separately from the control unit 13.

In the present embodiment, the communication unit 58 is capable of communicating with other devices via a network.

Cooperation of software stored in the storage unit 57, the ROM 51, or the like with hardware resources of the control unit 13 achieves information processing of the control unit 13 having the hardware configurations as described above. Specifically, loading a program that configures the software, which has been stored in the ROM 51 or the like, to the RAM 52 and executing it achieves the control method according to the present technology.

The control unit 13 installs the program via the recording medium 60, for example. Alternatively, the control unit 13 may install the program via a global network or the like. Otherwise, any computer-readable non-transitory storage medium may be used.

Cooperation of a computer mounted on a communication terminal with another computer capable of communicating with it via a network or the like may execute the control method and the program according to the present technology and configure the control unit according to the present technology.

That is, the aerial vehicle, the control method, and the program according to the present technology may be performed not only in a computer system constituted by a single computer but also in a computer system in which a plurality of computers cooperatively operate. It should be noted that in the present disclosure, the system means a set of a plurality of components (e.g., apparatuses, modules (parts)) and it does not matter whether or not all the components are housed in the same casing. Therefore, both of a plurality of apparatuses housed in separate casings and connected to one another via a network and a single apparatus having a plurality of modules housed in a single casing are the system.

Executing the aerial vehicle, the control method, and the program according to the present technology by the computer system includes, for example, both of a case where a single computer executes sensor abnormality detection, flight parameter record, flight parameter reproduction, and the like and a case where different computers execute the respective processes. Moreover, executing the respective processes by a predetermined computer includes causing another computer to execute some or all of those processes and acquiring the results.

That is, the aerial vehicle, the control method, and the program according to the present technology can also be applied to a cloud computing configuration in which a plurality of apparatuses shares and cooperatively processes a single function via a network.

The respective configurations such as the detection unit, the recording unit, the reproduction unit, the control flow of the communication system, and the like, which have been described with reference to the respective drawings, are merely embodiments, and can be arbitrarily modified without departing from the gist of the present technology. That is, any other configurations, algorithms, and the like for carrying out the present technology may be employed.

It should be noted that the effects described in the present disclosure are merely exemplary and not limitative, and further other effects may be provided. The description of the plurality of effects above does not necessarily mean that those effects are provided at the same time. It means that at least any one of the above-mentioned effects is obtained depending on a condition and the like, and effects not described in the present disclosure can be provided as a matter of course.

At least two features of the features of the above-mentioned embodiments may be combined. That is, the various features described in the respective embodiments may be arbitrarily combined across the respective embodiments.

It should be noted that the present technology can also take the following configurations.

(1) An aerial vehicle, including:
   a recording unit that records a flight parameter during flight in a state in which no sensor abnormality is detected;
   a detection unit that detects the sensor abnormality; and
   a reproduction unit that reproduces the flight parameter on the basis of the sensor abnormality detected by the detection unit.

(2) The aerial vehicle according to (1), in which
   the flight includes at least one of take-off, climb, hovering, descent, or landing.

(3) The aerial vehicle according to (2), in which
   the hovering includes a state in which coordinates of the aerial vehicle do not change.

(4) The aerial vehicle according to (1), in which
   the flight parameter includes at least one of a current value of a rotor mounted on the aerial vehicle, a voltage value of the rotor, a rotational speed value of an electric speed controller (ESC) mounted on the aerial vehicle, a current value of the ESC, or a voltage value of the ESC.

(5) The aerial vehicle according to (1), in which
   the sensor includes at least one of a global positioning system (GPS), an inertial measurement unit (IMU), an atmospheric pressure sensor, or a geomagnetic sensor.

(6) The aerial vehicle according to (5), in which
   the detection unit detects the sensor abnormality in a case where at least one of a value of change of the GPS, a value of change of the IMU, a value of change of the atmospheric pressure sensor, or a value of change of the geomagnetic sensor is equal to or higher than a threshold and there is no operation information related to the aerial vehicle.

(7) The aerial vehicle according to (1), further including
   an image-capture apparatus mounted on the aerial vehicle, in which
   the recording unit records the flight parameter in accordance with an image-capture condition related to a condition of the image-capture apparatus.

(8) The aerial vehicle according to (7), in which
   the image-capture condition includes at least one of a position of the image-capture apparatus, an orientation of the image-capture apparatus, or an attitude of the image-capture apparatus.

(9) The aerial vehicle according to (8), in which
the reproduction unit reproduces the flight parameter on the basis of the position of the image-capture apparatus, the orientation of the image-capture apparatus, or the attitude of the image-capture apparatus when the sensor abnormality is detected.

(10) The aerial vehicle according to (7), in which
the detection unit detects the sensor abnormality on the basis of a captured image captured by the image-capture apparatus and operation information related to the aerial vehicle.

(11) The aerial vehicle according to (10), in which
the detection unit detects the sensor abnormality in a case where an amount of movement of the aerial vehicle estimated from the captured image is equal to or higher than a threshold and there is no operation information.

(12) The aerial vehicle according to (1), in which
the recording unit records the flight parameter during a time when the aerial vehicle climbs to a certain altitude and the aerial vehicle descends to a certain altitude, and
the reproduction unit reproduces the flight parameter on the basis of the sensor abnormality until the aerial vehicle is landed.

(13) A control method executed by a computer system, including:
recording a flight parameter during flight in a state in which no sensor abnormality is detected;
detecting the sensor abnormality; and
reproducing the flight parameter on the basis of the sensor abnormality detected by the detection unit.

(14) A program that causes a computer system to execute the steps of:
recording a flight parameter during flight in a state in which no sensor abnormality is detected;
detecting the sensor abnormality; and
reproducing the flight parameter on the basis of the sensor abnormality detected by the detection unit.

REFERENCE SIGNS LIST 1 aerial vehicle
2 GPS
3 IMU
4 atmospheric pressure sensor
5 geomagnetic sensor
8 gimbal camera
23 detection unit
24 recording unit
25 reproduction unit

The invention claimed is:

1. An aerial vehicle, comprising:
a recording unit configured to record a flight parameter of the aerial vehicle, wherein
the flight parameter is recorded in a case where the aerial vehicle is in flight in a state that corresponds to an absence of detection of sensor abnormality for one or more sensors associated with the aerial vehicle;
an operation information acquisition unit configured to:
acquire operation information associated with the aerial vehicle; and
provide information regarding one of a presence or an absence of the operation information;
a detection unit configured to:
receive the information regarding the one of the presence or the absence of the operation information, wherein
the received information indicates no operation information,
the no operation information is associated with a state of a hovering operation of the aerial vehicle, and
the hovering operation includes a state in which coordinates of the aerial vehicle remains same;
determine a difference between first sensor information acquired by the one or more sensors and second sensor information acquired by the one or more sensors, wherein
the first sensor information is acquired at a specific time before a current time, and
the second sensor information is acquired at the current time; and
detect the sensor abnormality based on the difference that is equal to or higher than a specific value in a case where the received information indicates the no operation information; and
a reproduction unit configured to reproduce the flight parameter based on the detected sensor abnormality.

2. The aerial vehicle according to claim 1, wherein
the flight includes at least one of a take-off operation, a climb operation, the hovering operation, a descent operation, or a landing operation of the aerial vehicle.

3. The aerial vehicle according to claim 1, wherein
the flight parameter includes at least one of a current value of a rotor on the aerial vehicle, a voltage value of the rotor, a rotational speed value of an electric speed controller (ESC) on the aerial vehicle, a current value of the ESC, or a voltage value of the ESC.

4. The aerial vehicle according to claim 1, wherein
the one or more sensors include at least one of a global positioning system (GPS), an inertial measurement unit (IMU), an atmospheric pressure sensor, or a geomagnetic sensor.

5. The aerial vehicle according to claim 4, wherein the detection unit is further configured to detect the sensor abnormality in a case where at least one of a value of change of information of the GPS, a value of change of information of the IMU, a value of change of information of the atmospheric pressure sensor, or a value of change of information of the geomagnetic sensor is equal to or higher than the specific value in the case where the received information indicates the no operation information.

6. The aerial vehicle according to claim 1, further comprising
an image-capture apparatus on the aerial vehicle, wherein
the recording unit is further configured to record the flight parameter based on an image-capture condition of the image-capture apparatus.

7. The aerial vehicle according to claim 6, wherein
the image-capture condition includes at least one of a position of the image-capture apparatus, an orientation of the image-capture apparatus, or an attitude of the image-capture apparatus.

8. The aerial vehicle according to claim 7, wherein
the reproduction unit is further configured to reproduce the flight parameter based on the position of the image-capture apparatus, the orientation of the image-capture apparatus, or the attitude of the image-capture apparatus in a case where the sensor abnormality is detected.

9. The aerial vehicle according to claim 6, wherein
the detection unit is further configured to detect the sensor abnormality based on an image captured by the image-capture apparatus and the operation information related to the aerial vehicle.

10. The aerial vehicle according to claim 9, wherein
the detection unit is further configured to detect the sensor abnormality in a case where an amount of movement of the aerial vehicle estimated from the captured image is equal to or higher than the specific value and the received information indicates the no operation information.

11. The aerial vehicle according to claim 1, wherein
the recording unit is further configured to record the flight parameter in a case where the aerial vehicle climbs to a first altitude and in a case where the aerial vehicle descends to a second altitude, and
the reproduction unit is further configured to reproduce the flight parameter based on the sensor abnormality until the aerial vehicle is landed.

12. A control method executed by a computer system, the method comprising:
recording a flight parameter of an aerial vehicle, wherein
the flight parameter is recorded in a case where the aerial vehicle is in flight in a state that corresponds to an absence of detection of sensor abnormality for one or more sensors associated with the aerial vehicle;
acquiring, by an operation information acquisition unit of the computer system, operation information associated with the aerial vehicle;
providing, by the operation information acquisition unit, information regarding one of a presence or an absence of the operation information;
receiving, by a detection unit of the computer system, the information regarding the one of the presence or the absence of the operation information, wherein
the received information indicates no operation information,
the no operation information is associated with a state of a hovering operation of the aerial vehicle, and
the hovering operation includes a state in which coordinates of the aerial vehicle remains same;
determining a difference between first sensor information acquired by the one or more sensors and second sensor information acquired by the one or more sensors, wherein
the first sensor information is acquired at a specific time before a current time, and
the second sensor information is acquired at the current time;
detecting the sensor abnormality based on the difference that is equal to or higher than a specific value in a case where the received information indicates the no operation information; and
reproducing the flight parameter based on the detected sensor abnormality.

13. A non-transitory computer-readable medium having stored thereon computer-executable instructions that when executed by a computer, cause the computer to execute operations, the operations comprising:
recording a flight parameter of an aerial vehicle, wherein
the flight parameter is recorded in a case where the aerial vehicle is in flight in a state that corresponds to an absence of detection of sensor abnormality for one or more sensors associated with the aerial vehicle;
acquiring, by an operation information acquisition unit of the computer, operation information associated with the aerial vehicle;
providing, by the operation information acquisition unit, information regarding one of a presence or an absence of the operation information;
receiving, by a detection unit of the computer, the information regarding the one of the presence or the absence of the operation information, wherein
the received information indicates no operation information,
the no operation information is associated with a state of a hovering operation of the aerial vehicle, and
the hovering operation includes a state in which coordinates of the aerial vehicle remains same;
determining a difference between first sensor information acquired by the one or more sensors and second sensor information acquired by the one or more sensors, wherein
the first sensor information is acquired at a specific time before a current time, and
the second sensor information is acquired at the current time;
detecting the sensor abnormality based on the difference that is equal to or higher than a specific value in a case where the received information indicates the no operation information; and
reproducing the flight parameter based on the detected sensor abnormality.

\* \* \* \* \*